United States Patent [19]
DeBello

[11] Patent Number: 5,540,867
[45] Date of Patent: Jul. 30, 1996

[54] HANGER-SUPPORTED LIQUID-GAS CONTACT BODY AND ASSEMBLY METHOD

[75] Inventor: Frederick B. DeBello, Cape Coral, Fla.

[73] Assignee: Munters Corporation, Fort Myers, Fla.

[21] Appl. No.: 153,974

[22] Filed: Nov. 18, 1993

[51] Int. Cl.⁶ ...................................................... B01F 3/04
[52] U.S. Cl. .................................... 261/112.2; 261/112.1; 261/DIG. 41; 261/DIG. 72; 55/491; 55/508
[58] Field of Search ........................... 261/112.2, 112.1, 261/DIG. 41, DIG. 72, 97, DIG. 11; 55/491, 508

[56]  References Cited

U.S. PATENT DOCUMENTS

| | | | |
|---|---|---|---|
| 2,408,158 | 9/1946 | Belsher | 261/DIG. 41 |
| 2,513,946 | 7/1950 | Kliefoth | 261/DIG. 41 |
| 2,850,269 | 9/1958 | Bohanon | 261/DIG. 41 |
| 3,075,750 | 1/1963 | Goettl | 261/97 |
| 3,245,668 | 4/1966 | Goettl | 55/491 |
| 3,479,018 | 11/1969 | Jaye | 261/DIG. 41 |
| 3,823,926 | 7/1974 | Bracich | 261/106 |
| 3,862,280 | 1/1975 | Polovina | 261/112 |
| 4,200,599 | 4/1980 | Goettl | 261/97 |
| 4,389,352 | 6/1983 | Bohanon | 261/DIG. 41 |
| 4,672,820 | 6/1987 | Goettl | 62/304 |
| 4,708,832 | 11/1987 | Norback | 261/112.2 |
| 5,027,251 | 10/1991 | Skold | 261/112.2 |
| 5,112,538 | 5/1992 | Thomas | 261/112.2 |
| 5,124,086 | 6/1992 | Schultz | 261/112.2 |
| 5,143,658 | 9/1992 | Thomas | 261/112.2 |
| 5,154,859 | 10/1992 | Bosquain et al. | 261/112.2 |
| 5,242,627 | 9/1993 | Lundin | 261/112.2 |

FOREIGN PATENT DOCUMENTS 247724 12/1960 Australia ............................ 261/112.2

*Primary Examiner*—Khanh P. Nguyen
*Attorney, Agent, or Firm*—Fitzpatrick Cella Harper & Scinto

[57]  ABSTRACT

A hanger-supported liquid-gas contact body includes a pad of cross corrugated fill having a width, top, front and back, and the pad has a transverse slot running across at least a portion of the pad's width. The slot starts at and forms an angle $\alpha$ with the back, so that the slot runs toward the pad front. A bent hanger having first and second legs is bent at an angle $\theta$ which is approximately equal to angle $\alpha$, and the first leg is disposed in the slot and the second leg abuts a portion of the pad back. In addition, a method for supporting cross-corrugated fill includes providing a pad of cross-corrugated fill having a width, top, front and back, the pad having a transverse slot running across at least a portion of pad width, this slot starting at and forming an angle $\alpha$ with the back. The slot runs toward the front of the pad. The method also involves providing a bent hanger having first and second legs, the hanger being bent at an angle $\theta$ which is approximately equal to $\alpha$, and inserting the first leg into the slot.

10 Claims, 3 Drawing Sheets

5,540,867

HANGER-SUPPORTED LIQUID-GAS CONTACT BODY AND ASSEMBLY METHOD

BACKGROUND OF THE INVENTION

1. Field of the Invention

The present invention relates to an improved contact body for use in a liquid and gas contact apparatus, such as a cooling system, and in particular, to structures and methods for supporting vertically-mounted contact bodies.

2. Description of the Related Art

Contact bodies or packings for gas and liquid contact apparatuses such as, for example, cooling towers, have been proposed. Such contact bodies have been formed from adjacent sheets of corrugated material. The corrugated sheets are typically skew-oriented such that their ridges or crests contact each other, thereby forming passages or channels between the sheets. These channels form passages having continuously varying widths, and thereby repeatedly change the directions of the gas and liquid flowing through the body. Such corrugated material is known as cross-corrugated fill. This arrangement of corrugations of adjoining sheets advantageously results in turbulent flow of the gaseous medium, which provides adequate heat exchange rates. Examples of such contact bodies can be found in U.S. Pat. Nos. 5,242,627, 5,143,658, 5,124,086; 5,112,538; 5,057,251 and 3,862,280. This type of contact body has been highly successful in use and is generally accepted and employed as a cooling tower or evaporative cooling medium, where water is introduced over it as air is blown therethrough. Preferably, such contact bodies are oriented vertically, so that fluid can flow downward through the cross-corrugated fill under the influence of gravity. However, if such a body is supported from the bottom, so that body presses downward, the body, because of the relatively low stiffness of the cross-corrugated fill, has a tendency to bow or buckle. Moreover, such sagging or buckling is most pronounced during operation of the cooling device, since during operation, the weight of the water passing through the cross-corrugated fill adds to the compressive load on the fill that causes sagging and buckling. Thus, evaporative pad and fan cooling systems are very expensive to install because of the need for complex systems for supporting the top and bottom of each pad. Also, in the case of thin cooling pads, center supports may be required in order to keep the pads from slumping and bowing out of the other supports. Moreover, it may be necessary to provide stiffeners in the body, or supports along the body. All of these devices will increase significantly the weight, cost and complexity of the apparatus.

SUMMARY OF THE INVENTION

The present invention relates to a hanger for supporting a pad of cross-corrugated evaporative cooling media, or fill ("cross-corrugated fill"), and a pad using the same. Typically such pads are formed from impregnated cellulose, glass fiber, or plastic sheets. If necessary, the corrugated sheets can be further rigidified by laminating a flat plastic sheet between some of the corrugated sheets. The flat plastic sheets can be spaced between all of the corrugated sheets, e.g. once every 12 inches, or with any other suitable spacing, constant or variable.

Pads constructed according to the present invention are hung from the top. This mounting scheme prevents bowing and slumping, which occurs if the pads are supported from the bottom by a gutter or bottom retainer.

The present invention provides a simple, reliable and sturdy way of supporting the cross-corrugated fill pads. The hanger for supporting these pads is simple and inexpensive to construct, and can be attached to the cross-corrugated fill pad with minimal modification of the pad.

The cross-corrugated fill pad hanger of the present invention is a bent support having first and second legs. The first leg is designed to engage a transverse slot formed in the cross-corrugated fill. The second leg is designed to be attached to a support.

Another aspect of this invention relates to a hanger-supported liquid-gas contact body which is constructed from a pad of cross corrugated fill having a width, top, front and back, the pad having a transverse slot running across at least a portion of the pad's width. The slot starts at and forms an angle $\alpha$ with the back so that the slot runs toward the front of the pad. A bent hanger having first and second legs is provided, the hanger being bent at an angle $\theta$ which is approximately equal to angle $\alpha$. The first leg is disposed in the transverse slot and the second leg abuts a portion of the back of the cross-corrugated fill.

Still another embodiment of this invention relates to a method for supporting cross-corrugated fill, and this method includes the step of providing a pad of cross-corrugated fill having a width, top, front and back, this pad also having a transverse slot running across at least a portion of the pad's width. The slot starts at and forms an angle $\alpha$ with the back, so that the slot runs toward the top of the pad of cross-corrugated fill. The method also involves providing a bent hanger having first and second legs, the hanger being bent at an angle $\theta$ which is approximately equal to $\alpha$, and inserting the first leg into the transverse slot.

Further embodiments of the invention relate to selecting $\alpha$ or $\theta$ to be between 0° and 90°, coating the hanger and a portion of the cross-corrugated fill with a coating material such as a water resistant adhesive or a synthetic elastomer, or using a hanger which is made of wire mesh.

DESCRIPTION OF THE PREFERRED EMBODIMENTS

The present invention will be more clearly understood in view of the following detailed description, taken together with the accompanying Figures.

Figure 2:
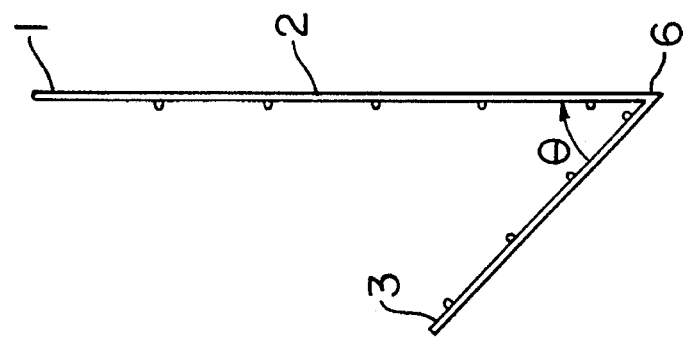
FIG. 2 is a side view of the hanger shown in FIG. 1.
Figure 1:
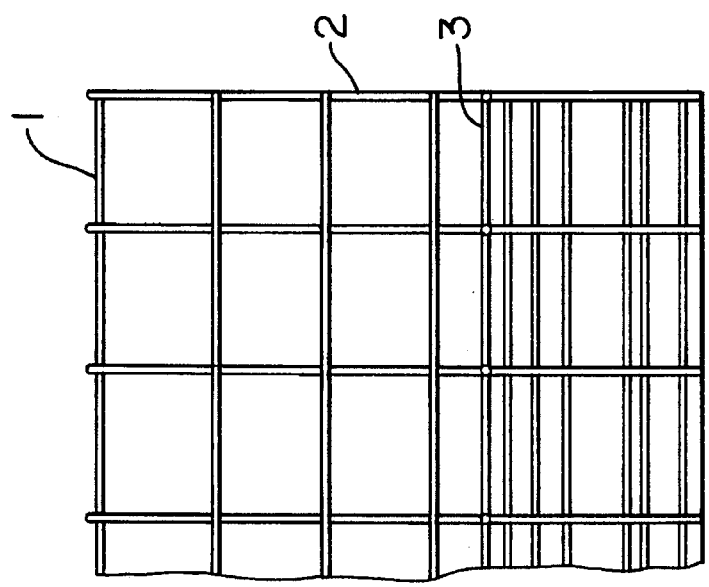
FIG. 1 is a front view of a hanger according to the present invention.

As depicted in FIGS. 1–2, the present relates in part, to a hanger 1 for supporting known types of cross-corrugated fill. The hanger 1 consists of at least one piece of stiff material, such as sturdy wire mesh, having a bend 6 therein. By virtue of this bend 6, the hanger has a long leg 2 and a short leg 3 (alternatively, the two legs could be of equal length). Although the angle formed by these two legs, $\theta$, can have any value between 0°–90°, it is preferably approximately 45°.

If desirable, prior to attachment to the cross-corrugated fill, the hanger 1 can be coated with a suitable water resistant adhesive, synthetic elastomer, or any other suitable solution 13. Such solutions can serve to protect the hanger from exposure to the evaporative cooling liquid, or help to attach the hanger and cross-corrugated fill. Alternatively, the hanger 1 can be attached to the cross-corrugated fill bare. The hanger and fill can then be dipped into or be sprayed with the solution.

Although the hanger 1 depicted in FIGS. 1–2 is shown as having been made from rectangular mesh, other materials also could be used. For example, the hanger 1 could be made from bent sheet metal, molded or machined polymer, or ceramic. However, wire mesh is preferable because it is lightweight, inexpensive and easy to bend.

Rectangular wire mesh is particularly preferred because of its lightness, strength, minimal interference with fluid and air flow, and low cost. Moreover, the mesh is easy to mount on a support, using brackets, hooks, or even nails.

In cases where the hanger 1 is made from material other than mesh, such as sheet metal, alternative well-known mounting techniques could be used to attach the hanger 1 to the support, such as nailing through the metal sheet.

Figure 4:
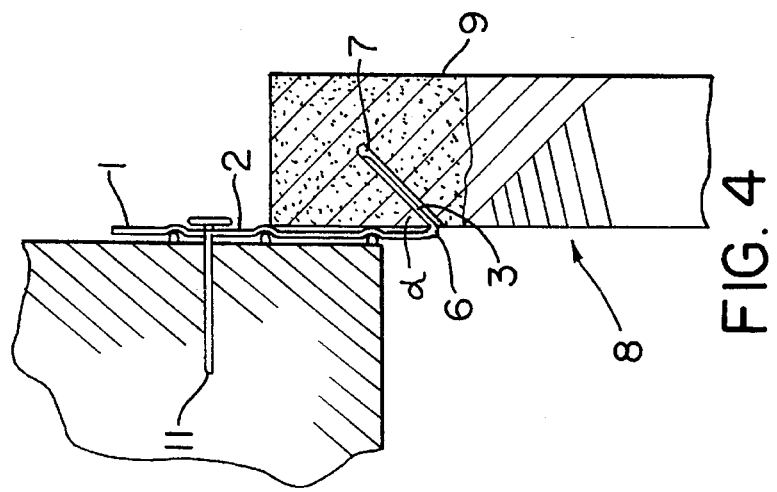
FIG. 4 is a side cross-sectional view along lines 4—4' of FIG. 3, in which the pad is mounted on a support.
Figure 3:
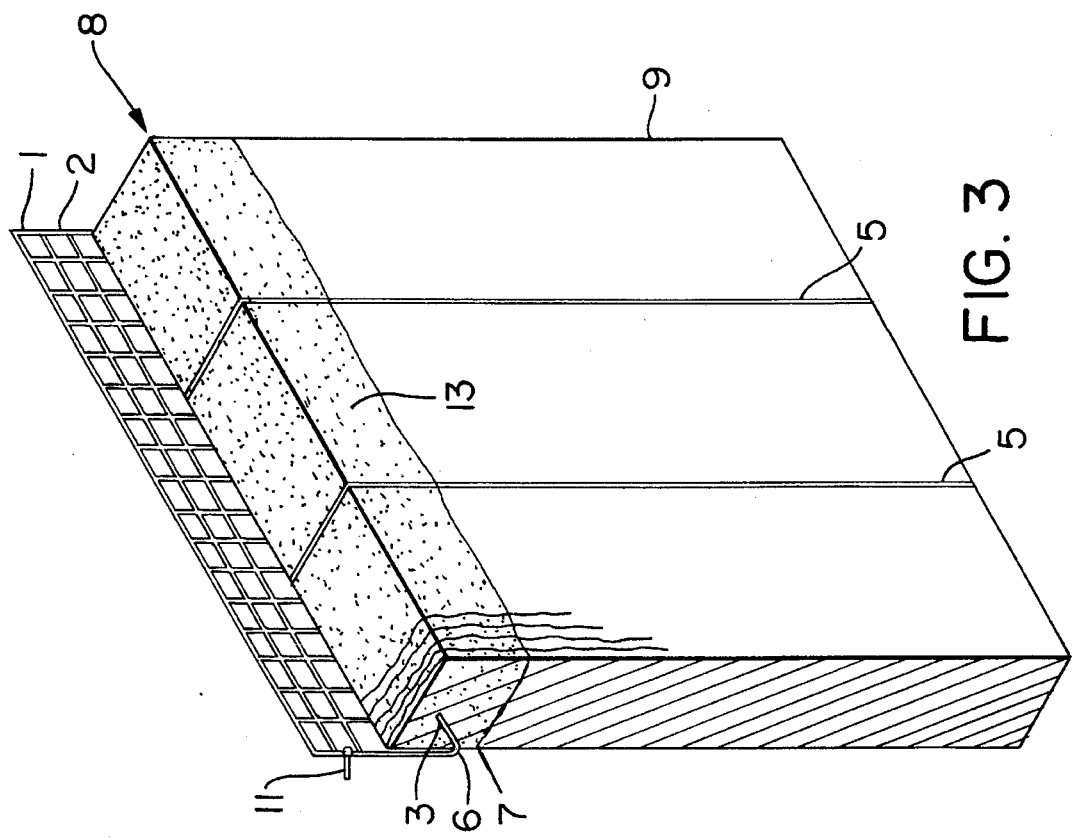
FIG. 3 is a perspective view of a cross-corrugated fill cooling pad hanger according to the present invention.

As shown in FIGS. 3–4, a hanger-supported liquid-gas contact body 8 constructed according to this invention includes a hanger 1 attached to the cross-corrugated fill 9. The hanger 1 is of the type previously described, and the cross-corrugated fill 9 can be of any desired type.

The cross-corrugated fill 9 can contain one or more stiffener sheets 5. These stiffener sheets 5 can extend along all or just part of the length of fill 9. These sheets can be made of plastic or any other suitable material.

The shorter leg of the hanger 1 rests in a slot 7 which runs widthwise across the cross-corrugated fill 9, and the hanger is dimensioned so that the bend 6 in the hanger causes the longer hanger leg 2 to abut the back of the cross-corrugated fill 9. Again, the hanger could also be constructed with equal length legs. It is also within the scope of the present invention to provide a hanger in which the leg inserted into the transverse slot 7 in the fill is longer than the leg which abuts the back of the fill.

It will be appreciated that by making the bend angle of the hanger 1 slightly smaller than the angle formed by the slot 7 and back of the cross-corrugated fill 9, the hanger is elastically deformed when it is mounted on the fill. This slight deformation of the hanger helps clasp the fill, and serves to wedge the two parts together.

The hanger 1 is preferably attached to the cross-corrugated fill 9 between ½" and 4" from the fill's top, although other dimensions could also be used. The hanger 1 is held in place by a water resistant adhesive, synthetic elastomer, or the like, which is applied by dipping the top of the fill, together with the hanger, into the adhesive or elastomer solution. This coating 13 makes the hanger an integral part of the fill, and also serves to stiffen the top of the fill, while protecting the hanger against corrosion, and the fill against erosion and abrasion. It will also be appreciated that if the transverse slot 7 and lower leg 3 of hanger 1 are suitably angled upward, the weight of the fill 9 will urge the fill onto the lower leg 3, further securing the assembly. Hangers may be spaced one per piece of fill, or continuously across the top of adjacent pieces of fill. Alternatively, multiple rows of hangers could be provided for each piece of fill, so that one row is disposed nearer the top of the fill than the other.

It also will be appreciated that the cross-corrugated fill 9 can be even more securely supported by having hanger 1 engage one or more stiffener sheets 5. For example, the stiffener sheets could be provided with a flared or enlarged upper portion (not shown) which fits onto lower leg 3, or which is bent to rest above transverse slot 7. This structure is particularly advantageous because it serves to better distribute the weight of the fill 9, and thereby reduces the likelihood that the fill hanging from hanger 1 will be damaged.

Likewise, it will be appreciated that the hanger could even more securely support the cross-corrugated fill by constructing the hanger from wire mesh, as mentioned, and having at least some of the vertical members which form the hanger extend out beyond the final horizontal wire member in the leg of the hanger (see FIG. 2) which fits into the transverse slot 7 in the cross-corrugated fill 9. Thus, these protruding vertical wire members would help support the fill by engaging with and at least partially supporting that cross-corrugated fill.

Figure 5:
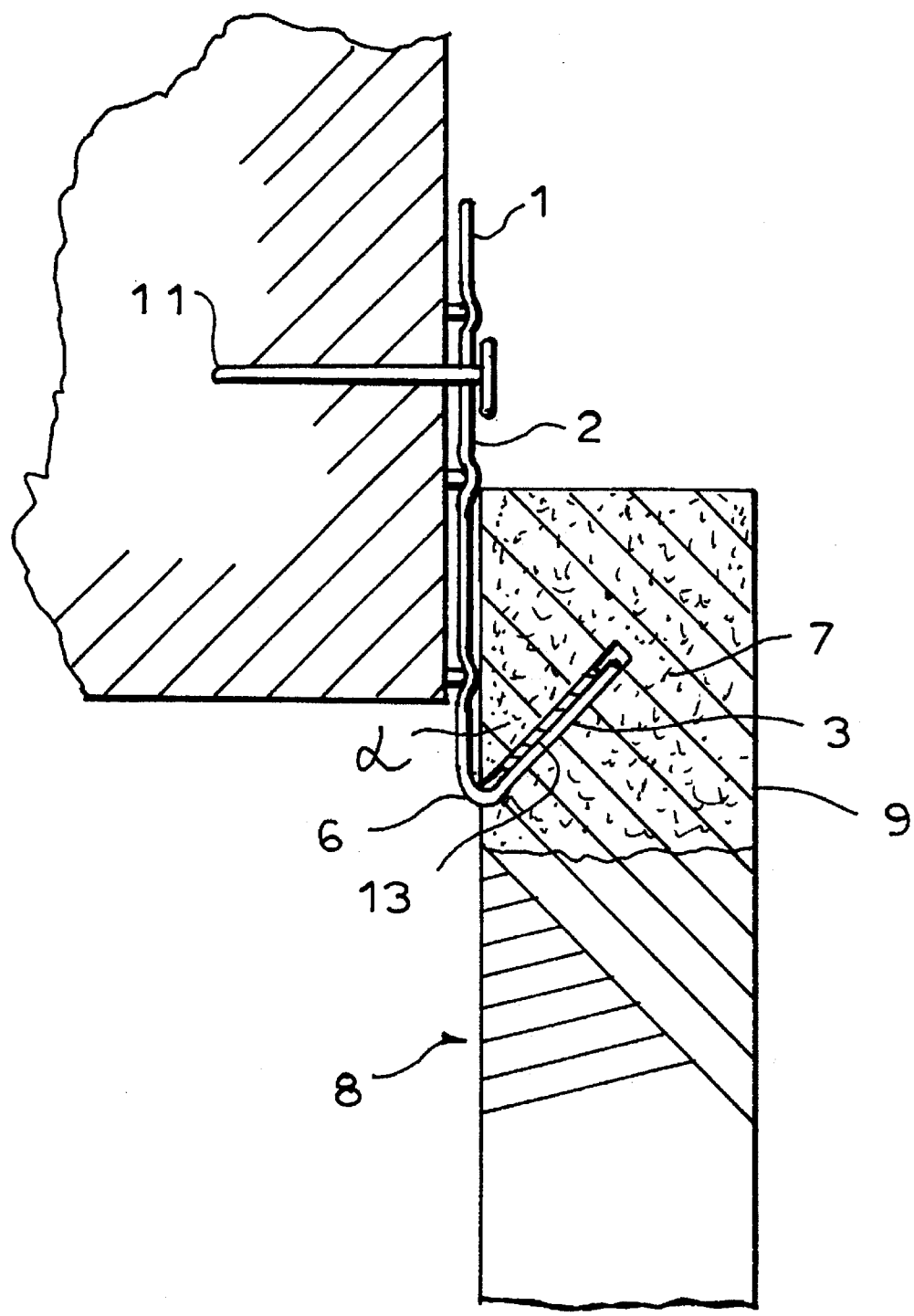
FIG. 5 is a side view similar to FIG. 4 of another embodiment of the invention.

Alternatively, transverse slot 7 could be lined with a sturdy support member (as seen in FIG. 5), such as a piece of plastic stripping, to better distribute the weight of the fill 9 on lower leg 3.

Cross-corrugated fill can be supported by first forming a transverse slot 7 in the fill 9, and then inserting into the slot a leg 3 of a bent hanger 1 of the type already described. Again, the bend 6 can be between 0°–180°, more preferably is between 0°–90°, and most preferably, is approximately 45°. Next, the hanger and top of the fill are coated with a suitable water resistant adhesive or synthetic elastomer coat 13, such as by dipping or spraying. After curing, the assembled fill pad can be hung by the wire mesh.

Although the present invention has been described herein in detail in connection with the accompanying drawings, it will be understood that various changes and modifications may be effected by those skilled in the art without departing from the spirit or scope of this invention, as described and claimed.

What I claim is:

1. A hanger-supported liquid-gas contact body comprising:

a pad of cross corrugated fill having opposed sides, a width, a top edge, and front and back surfaces extending from said top edge along said width, said pad having a transverse elongated slot formed in one of said front and back surfaces running across a substantial portion of the width of said pad below said top edge, said slot forming an angle $\alpha$ with the surface in which it is formed and running from that surface toward the other of said surfaces of said pad; and a bent hanger having a width substantially equal in length to the length of said slot and having a width substantially equal in length to the length of said slot and having a first elongated leg along its width nd a second integral leg, said hanger being bent at an angle $\theta$ which is approximately equal to the angle $\alpha$ to define said legs, said first elongated leg being disposed in said slot and said second leg abutting a portion of the back surface of said cross-corrugated fill in which the slot is formed.

2. A hanger-supported liquid-gas contact body according to claim 1, wherein $0° < \alpha \leq 90°$.

3. A hanger-supported liquid-gas contact body according to claim 1, wherein said hanger is made of wire mesh.

4. A hanger-supported liquid-gas contact body according to claim 3, wherein said wire mesh comprises a plurality of vertical members and a plurality of widthwise members running parallel to said width of said pad, including a last said horizontal member which defines a horizontal edge of said second leg, and at least some of said vertical members which are a portion of said second leg extend beyond said horizontal edge of said second leg so as to engage with and at least partially support said cross-corrugated fill.

5. A hanger-supported liquid-gas contact body according to claim 7, wherein said first leg is shorter than said second leg.

6. A hanger-supported liquid-gas contact body comprising:

a pad of cross corrugated fill having a width, a top, a front and a back, said pad having a transverse slot running across at least a portion of the width of said pad said slot forming an angle $\alpha$ with said back, and running toward said front of said pad; and a bent hanger having a first leg and a second leg, said hanger being bent at an angle $\theta$ which is approximately equal to angle $\alpha$, said first leg being disposed in said slot and said second leg abutting a portion of said back of said cross-corrugated fill;

said hanger and at least a portion of said cross-corrugated fill in a vicinity of said slot being coated with a coating material which is at least one of a water resistant adhesive and a synthetic elastomer.

7. A hanger-supported liquid-gas contact body according to claim 1, further comprising at least one stiffening member engaging said cross-corrugated fill.

8. A hanger-supported liquid-gas contact body according to claim 7, wherein at least one said stiffening member engages said hanger.

9. A hanger-supported liquid-gas contact body comprising:

a pad of cross-corrugated fill having opposed sides, a width, a top edge, and front and back surfaces extending from said top edge along said width, said pad having a transverse slot formed in one of said front and back surfaces running across at least a portion of the width of said pad below said top edge, said slot forming an angle $\alpha$ with the surface in which it is formed, and running from that surface toward the other of said surfaces of said pad; and a bent hanger having a first leg and a second leg, said hanger being bent at an angle $\theta$ which is approximately equal to angle $\alpha$ to define said legs, said first leg being disposed in said slot and said second leg abutting a portion of the surface of said cross-corrugated fill in which the slot is formed and a support disposed in said transverse slot, said hanger engaging said support, wherein said support distributes a force exerted by said hanger across said transverse slot in said pad a cross-corrugated fill.

10. A hanger-supported liquid-gas contact body comprising:

a pad of cross-corrugated fill having opposed side edges, a top edge and front and back surfaces extending from said top edge between said side edges and hanger means for supporting the fill in a housing, said back surface of said pad and said hanger means having cooperating means for supporting the pad on the hanger with the hanger extending along said back surface beyong said top edge; said cooperating means comprising a transverse slot formed in said back surface of the pad and a bent portion of the hanger positioned in said slot; said hanger and at least a portion of said cross-corrugated fill in the vicinity of said slot being coated with a coating material which is at least one of a water-resistant adhesive and a synthetic elastomer.

* * * * *